(12) United States Patent
Van Wiemeersch et al.

(10) Patent No.: US 7,825,779 B2
(45) Date of Patent: Nov. 2, 2010

(54) REMOTE ENTRY CHIRP SOUND REDUCTION METHOD AND SYSTEM

(75) Inventors: John Van Wiemeersch, Novi, MI (US); John Demetriou, Dexter, MI (US); Lisa Boran, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 12/132,011

(22) Filed: Jun. 3, 2008

(65) Prior Publication Data

US 2009/0295553 A1 Dec. 3, 2009

(51) Int. Cl.
*B60R 25/10* (2006.01)
(52) U.S. Cl. .............. 340/426.16; 340/425.5; 340/5.72; 340/825.57
(58) Field of Classification Search .............. 340/452.5, 340/426.16, 426.2, 426.3, 384.4, 384.5, 384.7, 340/384.71, 384.73, 388.1, 391.1, 425.5, 340/5.72
See application file for complete search history.

(56) References Cited

U.S. PATENT DOCUMENTS

| | | | |
|---|---|---|---|
| 5,572,185 A | 11/1996 | Chen et al. | |
| 6,049,268 A * | 4/2000 | Flick | 340/425.5 |
| 6,788,188 B2 * | 9/2004 | Sague | 340/384.72 |
| 6,927,685 B2 | 8/2005 | Wathen | |
| 7,170,419 B2 | 1/2007 | Masui | |
| 7,179,419 B2 * | 2/2007 | Lin et al. | 422/33 |
| 7,397,021 B2 * | 7/2008 | Shibata | 250/238 |
| 2006/0197380 A1 | 9/2006 | Dicroce | |
| 2007/0257789 A1 * | 11/2007 | Juel | 340/506 |
| 2008/0238043 A1 * | 10/2008 | Chlystek | 280/727 |

* cited by examiner

*Primary Examiner*—Benjamin C Lee
*Assistant Examiner*—Quang Pham
(74) *Attorney, Agent, or Firm*—Frank MacKenzie; Price, Heneveld, Cooper, DeWitt & Litton, LLP

(57) ABSTRACT

A vehicle remote entry locking or unlocking chirp sound reduction system including a remote transmitter operable to transmit a signal, a receiver operable to receive the signal from the remote transmitter, a controller operably connected to the receiver and being operable in response to the signal from the remote transmitter, and a horn operably connected to the controller. The controller may be configured to cause the horn to generate an audible signal having a predetermined pulse duration which depends on at least one characteristic of a vehicle prior to or during actuation of the remote transmitter. Also provided is a method of reducing the sound of an audible signal generated by actuation of a vehicle remote entry system.

23 Claims, 16 Drawing Sheets

REMOTE ENTRY CHIRP SOUND REDUCTION METHOD AND SYSTEM

BACKGROUND OF INVENTION a. Field of Invention

The invention relates generally to a remote entry chirp for a vehicle, and, more particularly, to a remote entry chirp sound reduction method and system that utilizes a conventional traffic horn and controls pulse duration as a function of one or more vehicle characteristics, such as system voltage, the time since turning the ignition OFF, and/or temperature.

b. Description of Related Art

Many vehicles are configured to provide a locking and/or unlocking confirmation tone (e.g., chirp) for the Remote Keyless Entry (RKE) system. The chirp may be generated using the vehicle's conventional traffic horn in an effort to reduce cost and stay competitive in the automotive field. The sound pressure level (dBA) output of the traffic horn must meet a minimum regulation for traffic use which is often too loud for RKE applications. The regulation intent for the traffic horn is designed to ensure that the vehicle provides sufficient sound to achieve the traffic horn's primary purpose of alerting other drivers or pedestrians when the driver actuates the horn switch and/or pad. The regulation requires a minimum of 93 dB measured at 7 meters in front of the vehicle (see FIG. 1). In order to meet this requirement, each horn or dual-horn assembly is usually placed close to the front of the vehicle (e.g., just behind the grille) to ensure optimal sound delivery for traffic situations. Chirps or confirmation tones utilizing the vehicle's conventional traffic horn placed in this front location generally emit too much sound for the locking/unlocking confirmation tones associated with the RKE applications. Chirps or confirmation tones utilizing the vehicle's conventional traffic horn may be considered too loud or may not convey a pleasant and/or luxurious sound to a typical consumer.

Some vehicles (e.g., luxury vehicles) may install a separate locking/unlocking chirp sounder for the RKE system and package it deep in the engine compartment to help reduce the sound level. However, the use of a separate locking/unlocking chirp sounder, along with the associated wiring and bracket, can increase the cost per vehicle.

For those vehicles that cannot incur the added cost of a separate locking/unlocking chirp sounder, attempts to reduce and/or minimize the locking/unlocking chirp sound level have focused on reducing a traffic horn pulse duration to prevent the traffic horn from reaching peak sound pressure level. However, as the pulse is reduced (e.g., below 40 ms), there may be a risk that the horn or dual-horn assembly may not start up due to a lack of adequate time to place the horn plates in oscillation. This risk may be greatest, for example, at low voltage and high temperature due to less energy and higher circuit resistance. Further, if the pulse is too short, the horn or dual-horn assembly may make poor quality and/or awkward sounds. Failure to start (e.g., begin oscillating) and/or poor quality horn sounds may result in increased horn and vehicle warranty claims due to the intermittent performance of the horn.

Accordingly, a decision may be made to rely on selecting the pulse duration that is sufficiently long to ensure start-up of the horn or dual-horn assembly in a worst-case scenario (e.g., even under the worst case conditions presented by (1) minimum battery voltage; (2) maximum operating temperature of the horn or dual-horn assembly; (3) maximum operating temperature of the wiring between the horn and the battery; and (4) the part-to-part distribution of the horn's or dual-horn assembly's electrical circuit). This may result in too long of a pulse at nominal voltage and room temperature, which may result in an unpleasant (e.g., too loud) chirp in many usage scenarios (e.g., (1) maximum battery/alternator voltage when chirps are performed with the engine running; (2) maximum battery voltage when chirps are performed with the engine OFF; (3) minimum horn temperature; and (4) minimum wiring temperature). The unpleasantness (e.g., loudness) of the chirp may be increased if commanded right after the vehicle is turned OFF since the system voltage can be as high as approximately 13.5 to 16 V if the vehicle was running. Typically, after a vehicle is turned OFF, the battery voltage may decay to approximately 12.4 V after a few minutes, assuming a good state of charge. If the pulse duration is not configured to ensure traffic horn performance in a worst-case scenario, then there will be some margin of intermittent operation under certain conditions, which may risk warranty and customer dissatisfaction.

Exemplary sound reduction methods in the prior art have focused on variation of the audible signal based on the transmission distance between a remote transmitter and a controller located in the vehicle (e.g., U.S. Pat. No. 6,049,268 issued to Flick) or on the ambient noise levels in or around the vehicle (e.g., U.S. Pat. No. 6,927,685 to Wathen), but have not addressed other parameters (e.g., specific vehicle conditions) that may significantly affect the volume of locking/unlocking confirmation tones or chirps for a RKE system.

Accordingly, there remains a need for a remote entry locking/unlocking confirmation tone and/or chirp for a vehicle that is less loud and/or unpleasant, with the tone/chirp still utilizing the existing traffic horn. There also remains a need for a method and system which allows for variation and/or adjustment of the pulse duration for the traffic horn depending upon measured and/or estimated conditions of the vehicle, including, for example and without limitation, vehicle system voltage and traffic horn temperature. Yet further, there remains a need for a method and system which allows for a pulse duration that is below the minimum pulse duration required in a worst-case scenario (e.g., low voltage and high temperature), while still ensuring actuation of the traffic horn for a RKE system.

SUMMARY OF INVENTION

The invention solves the problems and overcomes the drawbacks and deficiencies of prior art systems and methods of providing a remote entry locking/unlocking confirmation tone and/or chirp for a vehicle that is less loud and/or unpleasant, while still utilizing the existing traffic horn. The inventive method and system may allow for variation and/or adjustment of the pulse duration for the traffic horn depending upon measured and/or estimated conditions of the vehicle, including, for example and without limitation, vehicle system voltage, traffic horn temperature, and temperature of the horn wiring. The inventive method and system may further allow for a pulse duration that is below the minimum pulse duration required in a worst-case scenario (e.g., low voltage and high temperature), while still ensuring actuation of the traffic horn for the RKE system.

In a particular embodiment, the invention provides a vehicle remote entry locking or unlocking chirp sound reduction system including a remote transmitter operable to transmit a signal, a receiver operable to receive the signal from the remote transmitter, a controller operably connected to the receiver and being operable in response to the signal from the remote transmitter, and a horn operably connected to the controller. The controller may be configured to cause the horn to generate an audible signal having a predetermined pulse duration which depends on at least one characteristic of a vehicle prior to or during actuation of the remote transmitter.

For the system described above, the pulse duration may be changeable by the controller. The vehicle characteristics may include, for example, voltage of a power supply of the vehicle, a period of time since a vehicle ignition was disengaged, a temperature of the horn and/or a temperature of vehicle wiring from a battery to the horn. The horn may be further usable as a traffic horn. The controller may store a default pulse duration, which for example, may be approximately 30-40 ms. The default pulse duration may be configured to ensure actuation of the horn at a vehicle system voltage of approximately 10 V and a horn temperature of approximately 85° C.

The invention also provides a method of reducing the sound of an audible signal generated by actuation of a vehicle remote entry system. The method may include providing a remote transmitter and a receiver, sending a signal from the remote transmitter to the receiver, determining a value for at least one characteristic of a vehicle, and generating the audible signal having a pulse duration that depends on the value determined for at least one characteristic of the vehicle.

For the method described above, the vehicle characteristics may include, for example, voltage of a power supply of the vehicle, a period of time since a vehicle ignition was disengaged, a temperature of a vehicle horn for generating the audible signal, and/or a temperature of vehicle wiring from a battery to a vehicle horn for generating the audible signal. The temperature of the horn may be determined using an ambient temperature sensor of an electronic automatic climate control system of the vehicle. The audible signal may be generated using a trumpet horn, which may be a traffic horn. In a particular embodiment, the pulse duration may be a default pulse duration, with the default pulse duration being determined using a default vehicle voltage and default horn temperature. In a particular embodiment, the pulse duration may be shorter than the default pulse duration if the determined value for at least one characteristic of the vehicle indicates that the voltage of the vehicle is greater than the default vehicle voltage or that the horn temperature is less than the default horn temperature. In another particular embodiment, the pulse duration may be determined using a table or algorithm that provides pulse duration as a function of vehicle voltage or ambient temperature. A cabin temperature sensor may also be provided for adjusting the algorithm for wiring resistance based on the cabin temperature and the ambient temperature sensor. The algorithm may be adjusted based on wiring resistance estimated from a HVAC cabin temperature sensor.

The invention yet further provides a method of reducing the sound of an audible signal generated by actuation of a vehicle remote entry system. The method may include providing a remote transmitter and a receiver, sending a signal from the remote transmitter to the receiver, and determining a period of time elapsed since a vehicle ignition was disengaged. The method may further include generating an audible signal having a first default pulse duration if the period of time exceeds a predetermined value and a second default pulse duration if the period of time is less than or equal to the predetermined value, with the first default pulse duration being greater than the second default pulse duration.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

Figure 1:
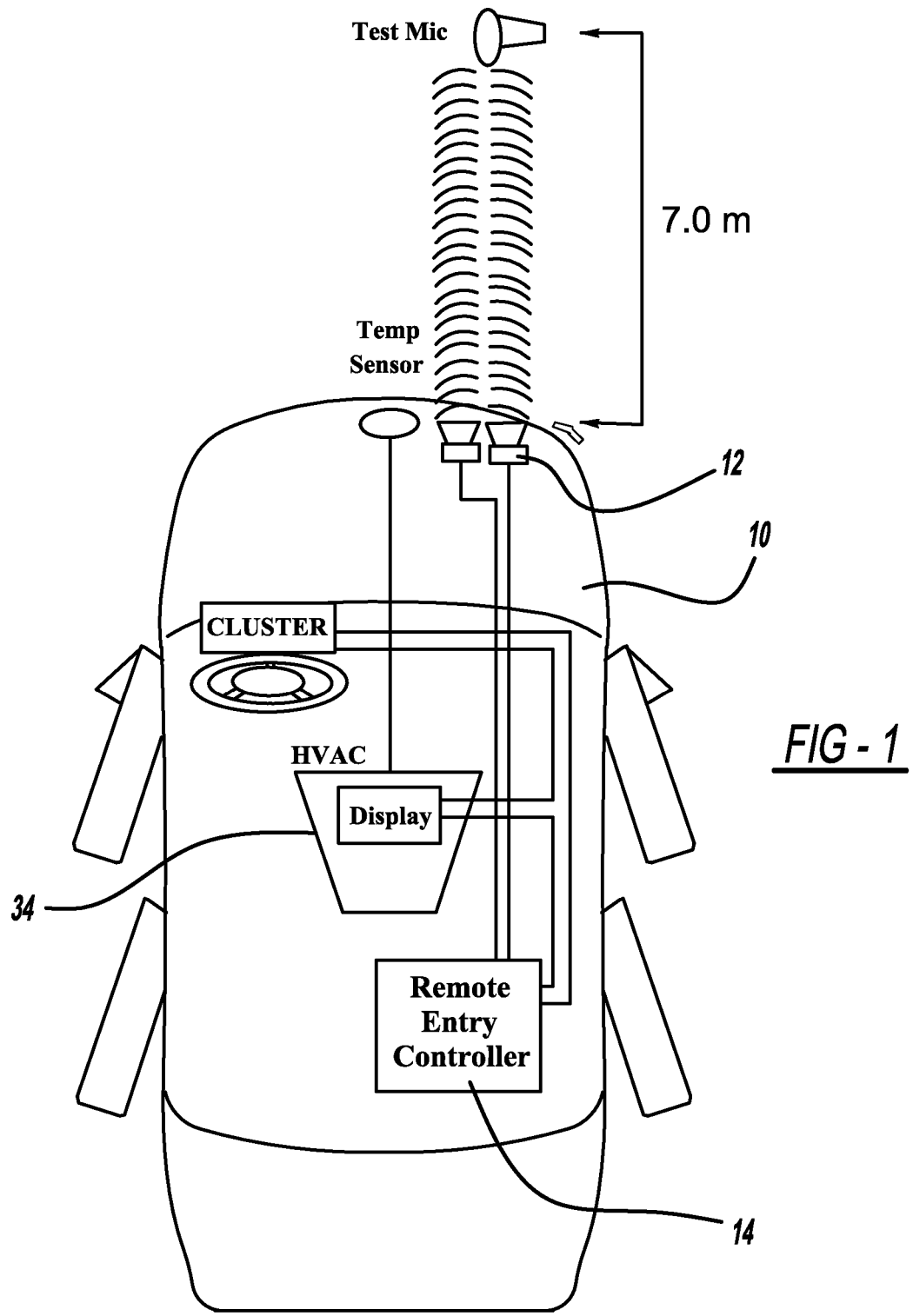
FIG. 1 is a diagram illustrative of a vehicle including a traffic horn and a RKE controller or module.

Referring now to the drawings wherein like reference numerals designate corresponding parts throughout the several views, FIG. 1 is a diagram illustrative of a vehicle 10 including a vehicle remote control system. The vehicle remote control system may include a remote transmitter (not shown), a receiver (not shown), a traffic horn 12, and a RKE controller or module 14. Vehicle 10 may be any conventional automobile or motor vehicle, including for example, a luxury automobile.

The remote transmitter may be operable to transmit a signal, and may be configured for carrying by a user to perform certain functions remote from vehicle 10 in a known manner. The remote transmitter may include a housing which contains the electronics and battery for transmission of commands to the receiver. For example, radio frequency (RF) signals may be transmitted by the remote transmitter to the receiver. The receiver may be operable to receive the signal from the remote transmitter, and may include an associated antenna. The receiver and RKE controller or module 14 may be contained within a single housing. The associated antenna of the receiver may be a wire antenna extending from the single housing or may be a remote antenna positioned in the window area of vehicle 10.

Figure 2A:
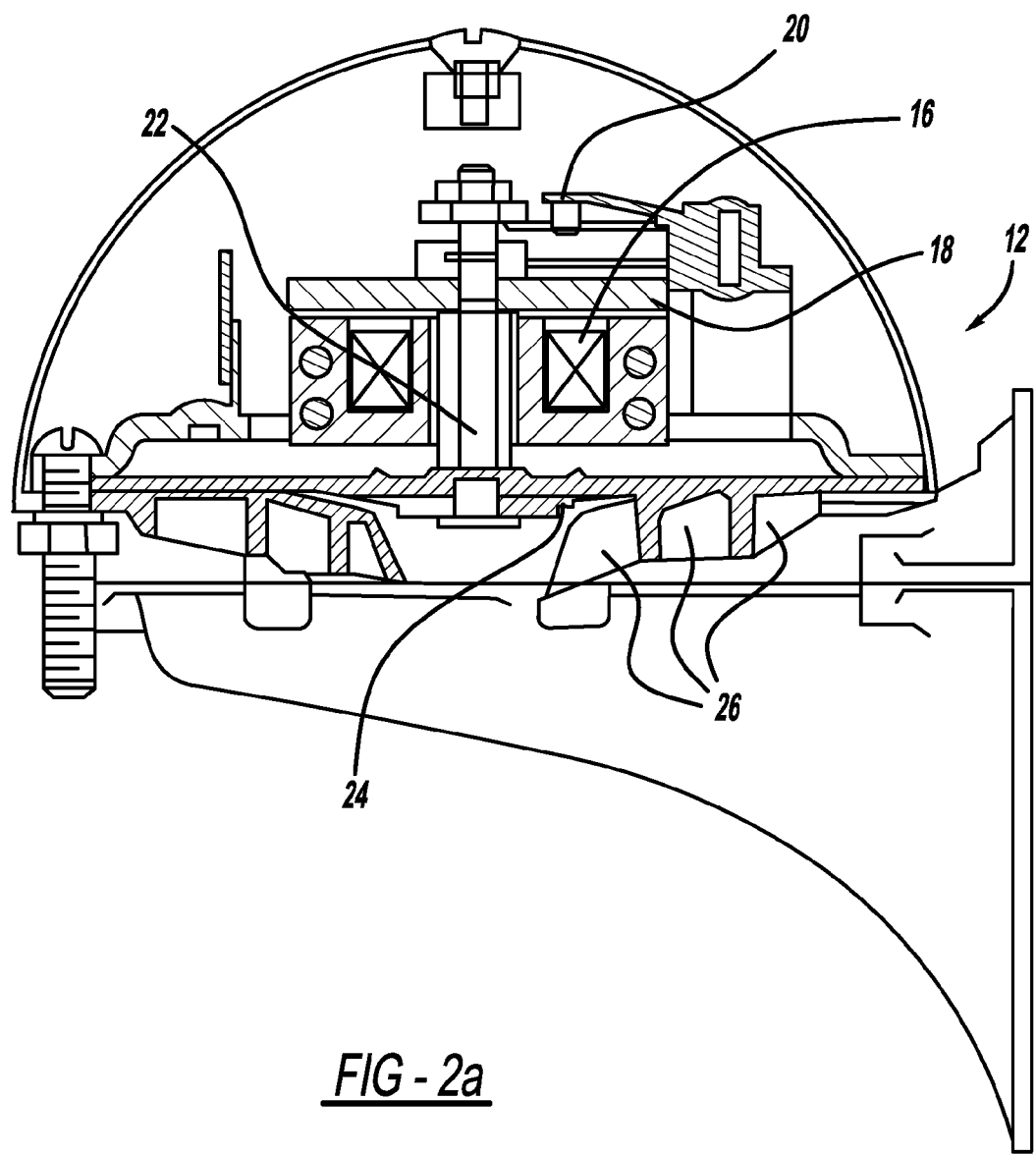
FIG. 2a is a diagram illustrative of an automotive trumpet horn.
Figure 2B:
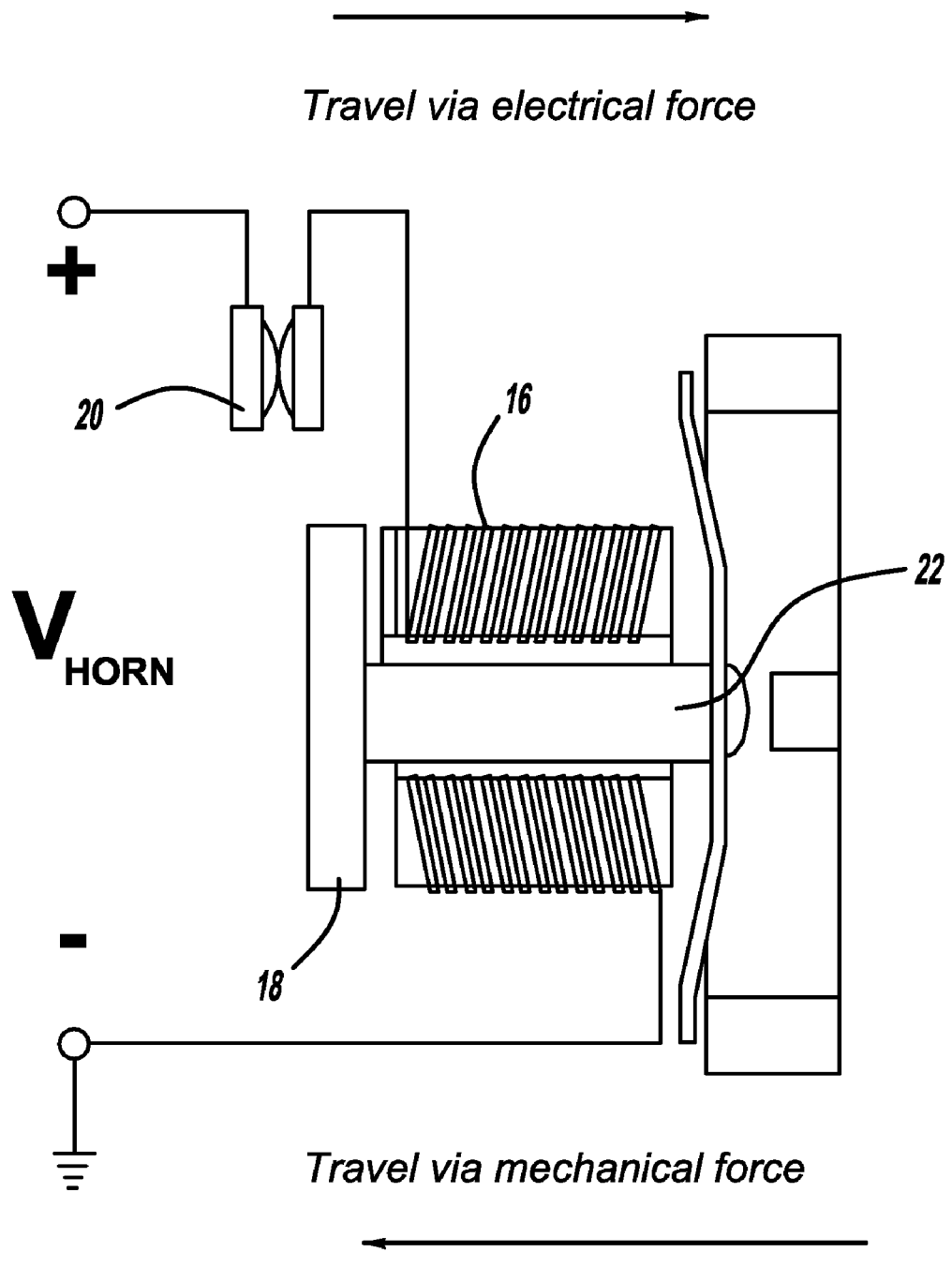
FIG. 2b is an electrical schematic for an automotive trumpet horn.

The operation of traffic horn 12 will now be described in detail with reference to FIGS. 2a and 2b.

Traffic horn 12 may include a conventional automotive trumpet horn which may be connected to RKE controller or module 14. Referring to FIGS. 2a and 2b, traffic horn 12 may generally include an electromagnetic coil 16, metal washer 18, contact points 20, armature 22, diaphragm 24, and spiral trumpet 26. Electromagnetic coil 16 may generate an electromagnetic field which attracts washer 18 whenever contact points 20 are closed. When power is first applied to the circuit terminals of horn 12, current may flow through contact points 20, energizing an electromagnet which may pull washer 18 toward electromagnetic coil 16. Since washer 18 and one-half of contact points 20 are attached to armature 22, diaphragm 24 may be moved and/or bent and contact points 20 may be opened, thereby breaking the circuit. The electromagnet may then release washer 18 and return it to its normal position which may flex diaphragm 24 in the opposite direction and then close the circuit on contact points 20. If power remains applied to horn 12 and the thermal limits of the material are not exceeded, the cycle may be repeated and the resulting pulsation may create the sound of horn 12. Spiral trumpet 26 may amplify the sound. The time required to move armature 22 may be a function of the amount of energy generated in the windings of electromagnetic coil 16, and this energy may be a function of the voltage applied to horn 12. If a large voltage is applied to horn 12, the first movement of armature 22 may be more rapid and the start-up of horn 12 will occur faster. If a low voltage is applied to horn 12 (i.e., but is still sufficiently large to initiate start-up), it may take longer for start-up to be achieved. This delay in the start-up of horn 12 may be due to the time required for armature 22 to move in the presence of the electromagnetic field generated by electromagnetic coil 16.

Horn start-up time variation with voltage will now be described in detail with reference to FIGS. 3-6.

Figure 3:
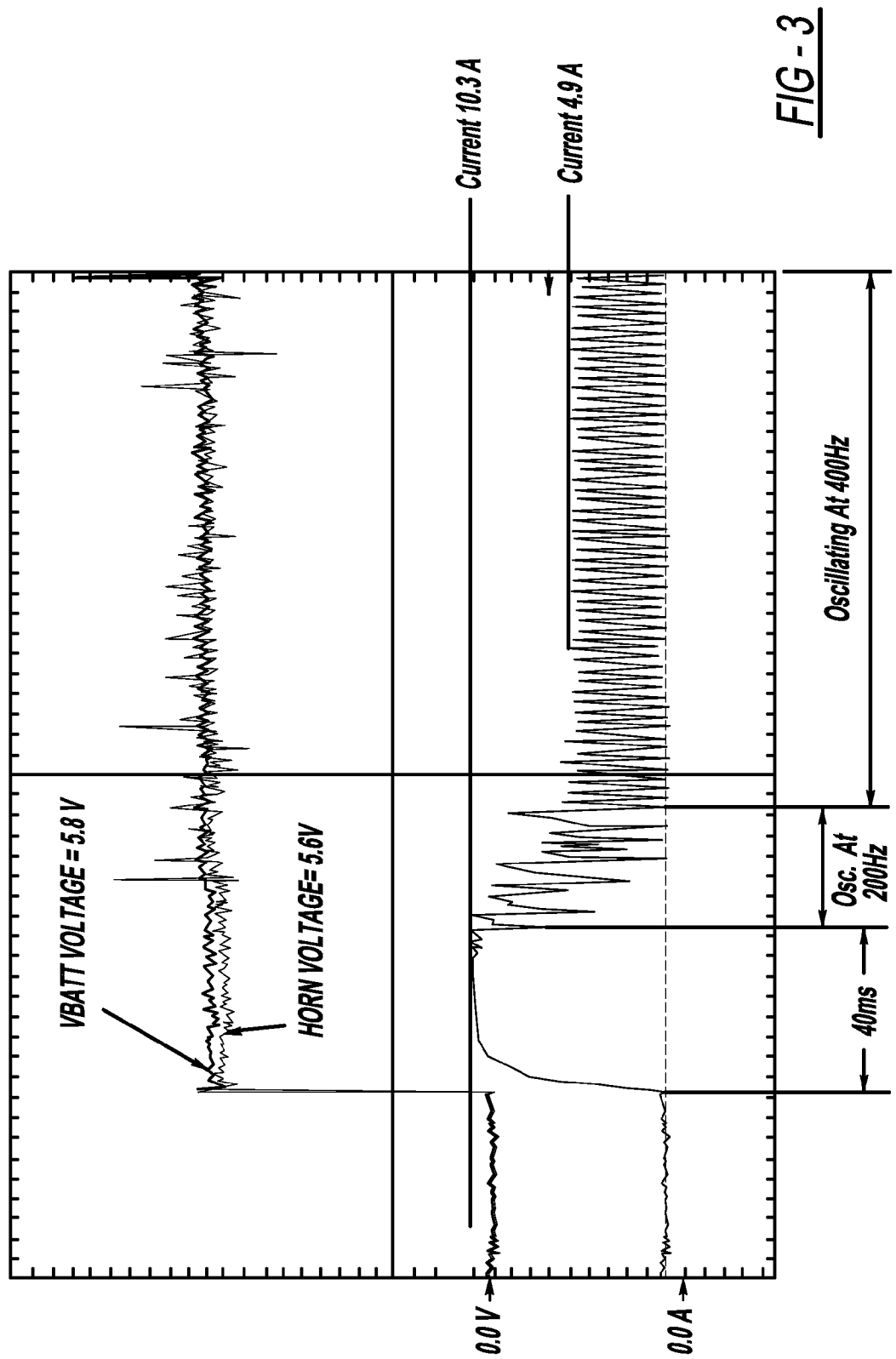
FIG. 3 is a graph showing start-up voltage for a single low note automotive trumpet horn.
Figure 4:
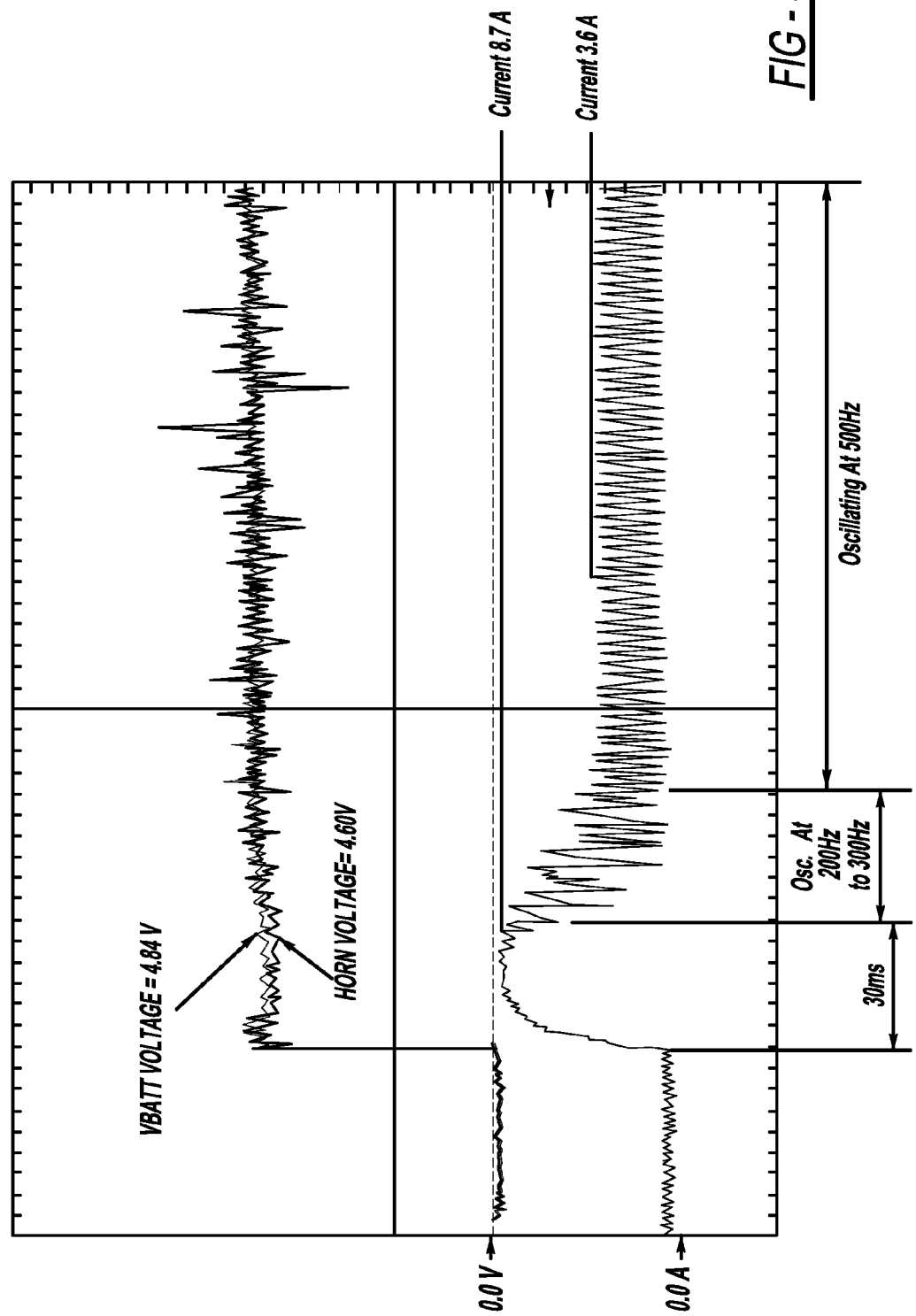
FIG. 4 is a graph showing start-up voltage for a single high note automotive trumpet horn.

Graphs depicting the start-up voltage for a single low note and high note automotive trumpet horn are shown in FIGS. 3 and 4, respectively. As illustrated in FIG. 3, with a minimum operating voltage of approximately 5.6 V (generated from an approximately 5.8 V source with just the series resistance of the horn assembly wiring—which may be approximately 20 mOhm), it may take approximately 40 ms for armature 22 of a single low note horn 12 to move to a position where start-up occurs. As illustrated in FIG. 4, with a minimum operating voltage of approximately 4.6 V (generated from an approximately 4.84 V source), it may take approximately 30 ms for armature 22 of a single high note horn 12 to move to a position where start-up occurs. The minimum operating voltage for the single low note horn and single high note horn may be determined empirically.

Figure 5:
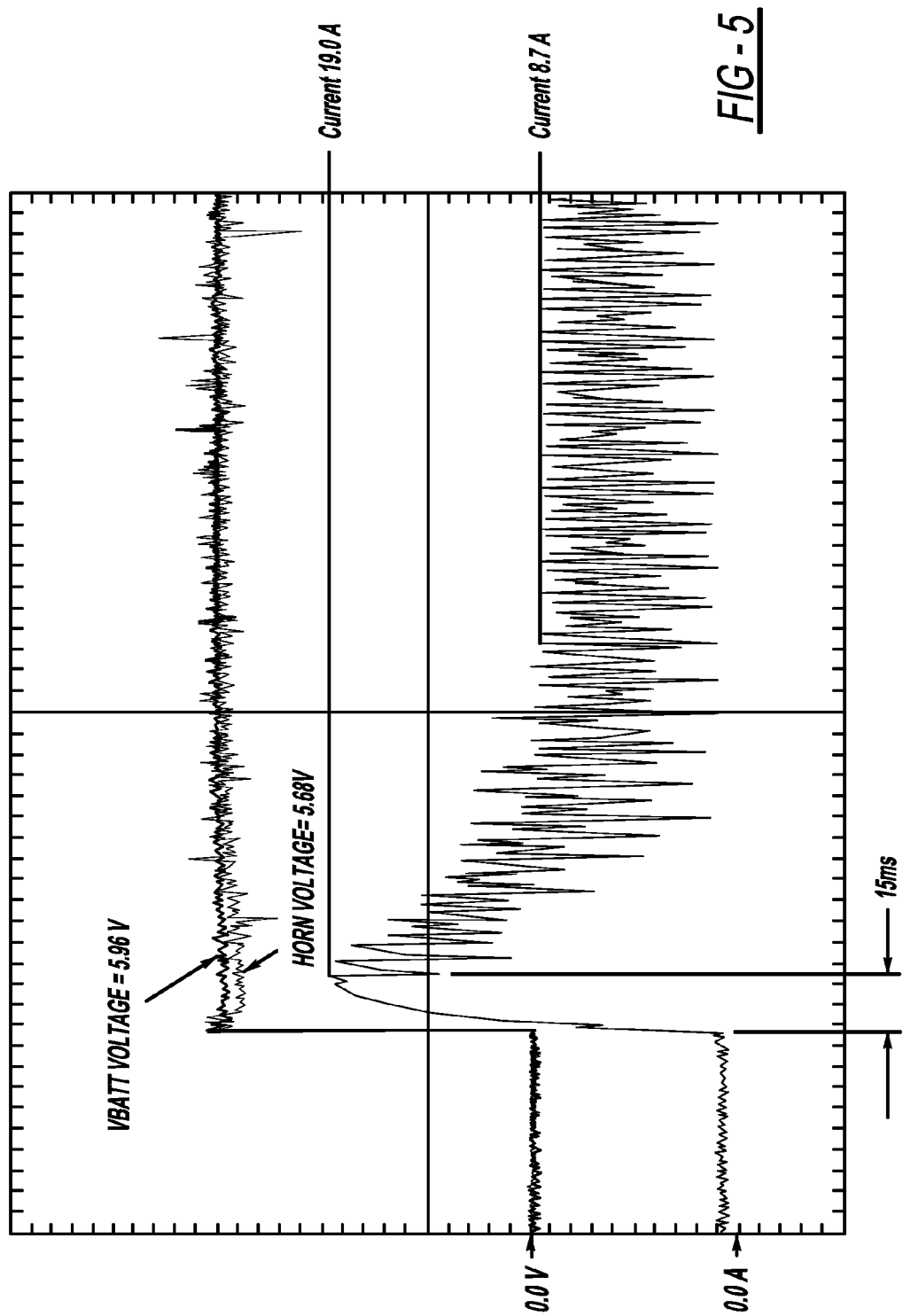
FIG. 5 is a graph showing start-up voltage for a dual horn assembly unit including the single low note horn of FIG. 3 and the single high note horn of FIG. 4.

A graph depicting the start-up voltage for a dual horn assembly unit including the single low note horn of FIG. 3 and the single high note horn of FIG. 4 is shown in FIG. 5. As illustrated, a minimum operating voltage of approximately 5.68 V (generated from an approximately 5.96 V source) may be applied to both horns across common terminals. The high note horn of the dual horn assembly may see approximately 1.1 V greater than its empirically determined minimum start-up voltage, which may deliver approximately 58 W to electromagnetic coil 16, rather than approximately 42 W (i.e., approximately a 38% increase). The additional 16 W of power may force armature 22 of the high note horn of the dual horn assembly to move to a position where start-up occurs at approximately 15 ms, rather than the 30 ms it took when the horn saw less power applied to electromagnetic coil 16. It may still take approximately 40 ms for armature 22 of single low note horn 12 to move to a position where start-up occurs. At approximately 50 ms, both the high note and the low note horns have reached their steady states frequencies of 400 Hz and 500 Hz.

Figure 6:
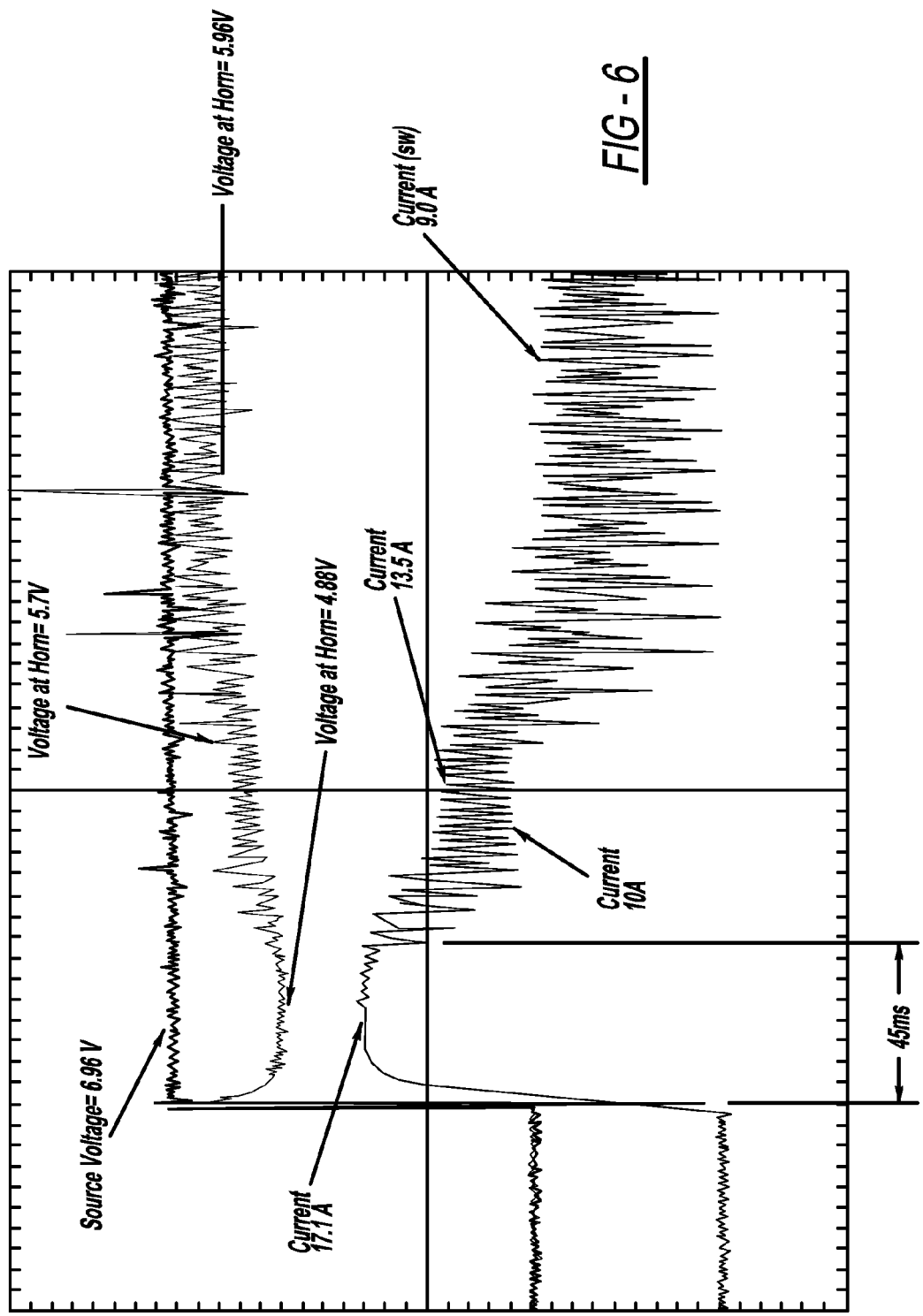
FIG. 6 is a graph showing start-up voltage for the dual horn assembly unit of FIG. 5, with a series of resistance added to the power feed to the electromagnetic coil.

A graph depicting the start-up voltage for a dual horn assembly unit of FIG. 5, with a series resistance of approximately 122 mOhms added to the power feed to electromagnetic coil 16, is shown in FIG. 6. The supply voltage may be increased in order to ensure adequate voltage for start-up. The available start-up current may be reduced from 19 A to 17 A for the same dual horn assembly unit. The combined power consumed by electromagnetic coil 16 of each horn dropped from approximately 108 W to approximately 83 W (i.e., approximately a 23% drop). The net effect may be less energy across electromagnetic coil 16, resulting in both horns taking longer to start. For example, the single high note automotive trumpet horn start-up time increased from approximately 15 ms (as shown in FIG. 5) to approximately 45 ms. In addition, the single low note automotive trumpet horn start-up time was extended from approximately 40 ms to approximately 85-90 ms.

There may be a minimum voltage at which a horn or a dual-horn assembly may always work. However, the magnitude of the voltage seen at the horn terminals may affect the horn's start-up time. Voltage seen at the horn terminals may vary due to any combination of the following conditions, for example: (1) vehicle battery voltage changes; (2) horn coil resistance changes with temperature; and/or (3) vehicle horn circuit wiring resistance changes with temperature. As these system and environmental factors change, the minimum time needed to ensure the horn or dual-horn assembly starts-up may also change. Conventionally, the worst-case time (e.g., corresponding to low voltage and high temperature) may generally be selected and power for that worst-case time may be applied in order to ensure that a RKE locking/unlocking confirmation tone (e.g., horn chirp) is heard. However, at normal and/or high voltages and room and/or cold temperatures, this may result in a RKE locking/unlocking confirmation tone (e.g., horn chirp) that is too long and/or too loud.

The effect of vehicle wiring on start-up time will now be described in detail with reference to FIGS. 7 and 8.

Figure 7:
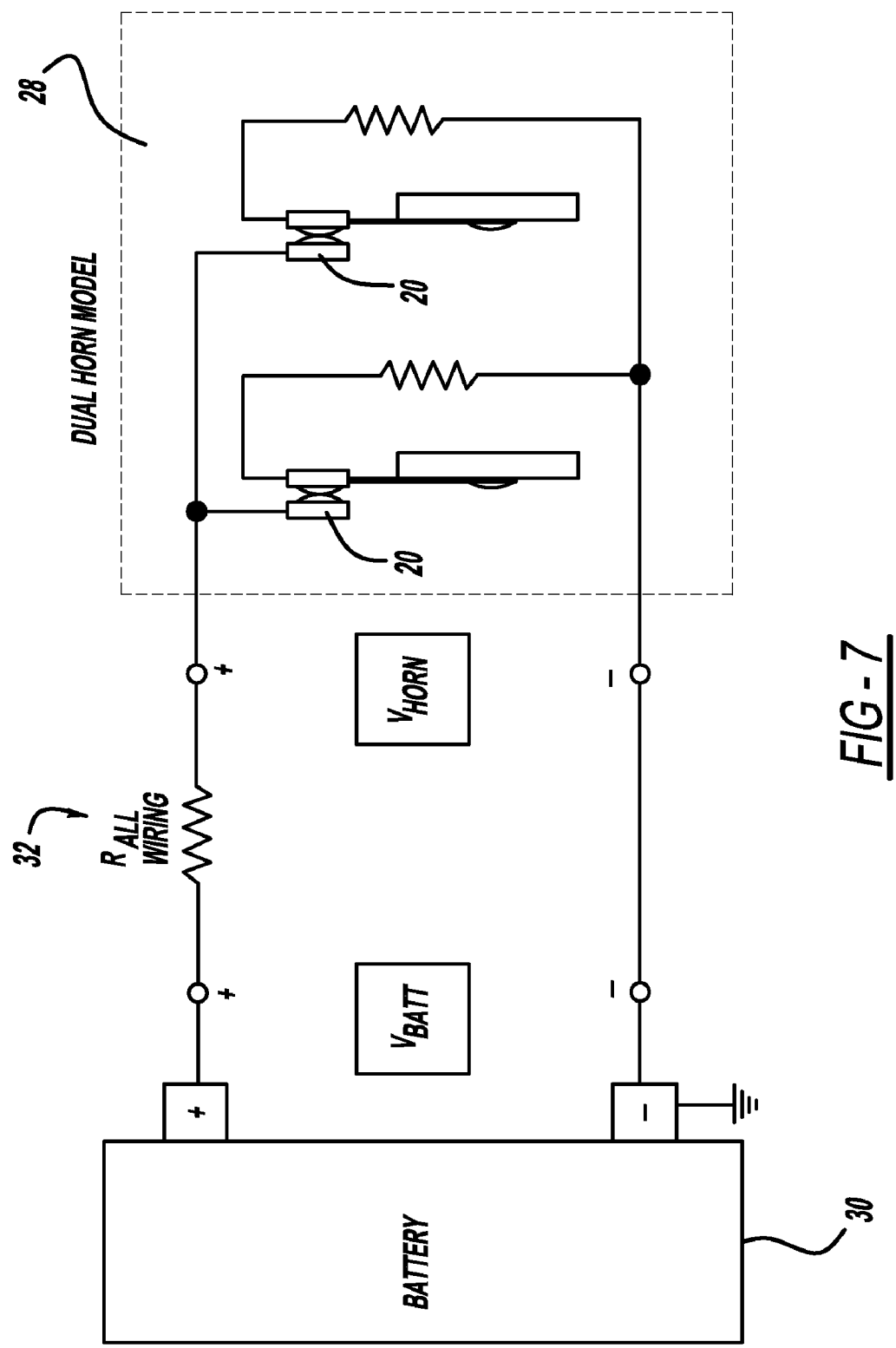
FIG. 7 is an electrical schematic for a simplified version of a dual horn assembly, the vehicle power supply, and the associated vehicle wiring resistance.
Figure 8:
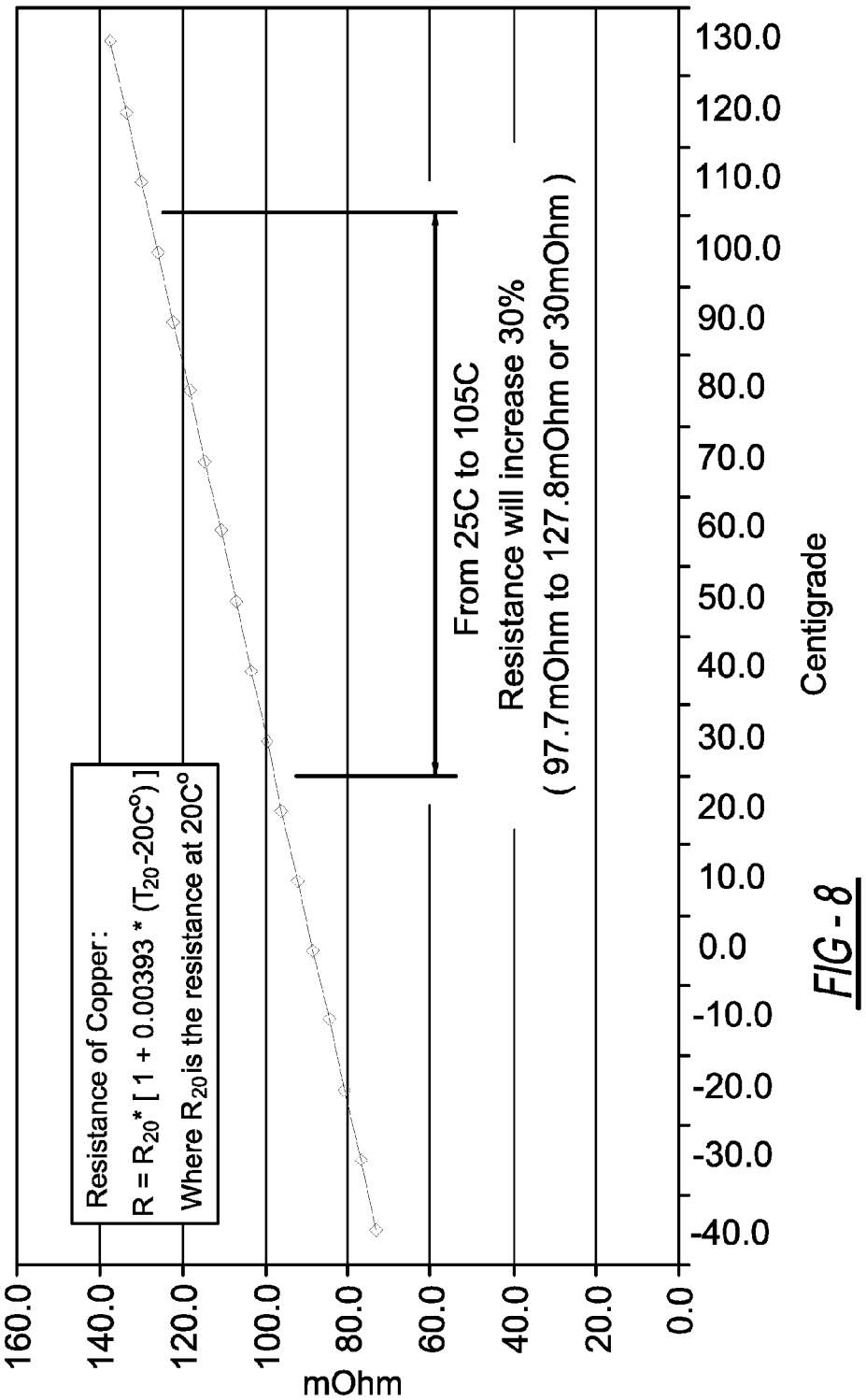
FIG. 8 is a graph illustrative of the change in resistance of vehicle wiring based on temperature.

Referring now to FIG. 7, a circuit schematic of a simplified version of a dual horn assembly 28, a vehicle power supply 30, and the associated vehicle wiring resistance 32 is shown. Dual horn assembly 28 may include one or more conventional trumpet horns 12, including contact points 20. Vehicle power supply 30 may include a vehicle battery. Referring now to FIG. 8, the effects of vehicle wiring on start-up time are illustrated. For example, FIG. 8 shows the total resistance of 15 feet of 18 gauge copper wire as a function of temperature. For example, and without limitation, the distance from vehicle power supply 30 (e.g., battery) positive terminal to electromagnetic coils 16 of horn 12 and back to the battery negative terminal may be approximately 15 feet on most vehicles (assuming that controller 14 is in the passenger cabin of the vehicle). Although 15 feet of wiring is mentioned in detail, the length of wiring may be longer or shorter in other embodiments as readily evident to those skilled in the art. A length of wiring of approximately 15 feet of 18 gauge copper wire may introduce approximately 100 mOhm of series resistance at room temperature, which can climb to approximately 120-130 mOhm as both horn 12 and the vehicle wiring temperature increase. Accordingly, on average, changes in resistance due to temperature can also alter the power delivered to electromagnetic coils 16 of horns 12 by up to as much as approximately 23% for a fixed voltage. For example, the applicable equation may be $$P = \frac{V^2}{1.0R}$$

as opposed to $$P = \frac{V^2}{1.3R}$$

depending on changes in resistance due to temperature. As shown in FIGS. 5 and 6, similar percent changes in power to electromagnetic coil 16 (e.g., because of changes in the magnitude of the voltage seen at the horn terminals) may affect the horn's start-up time. In particular, such similar percent changes in power to electromagnetic coil 16 may result in an approximate doubling of the time required to achieve start-up.

Management of the sound output of a horn will now be described in detail with reference to FIGS. 9 and 10.

Figure 9:
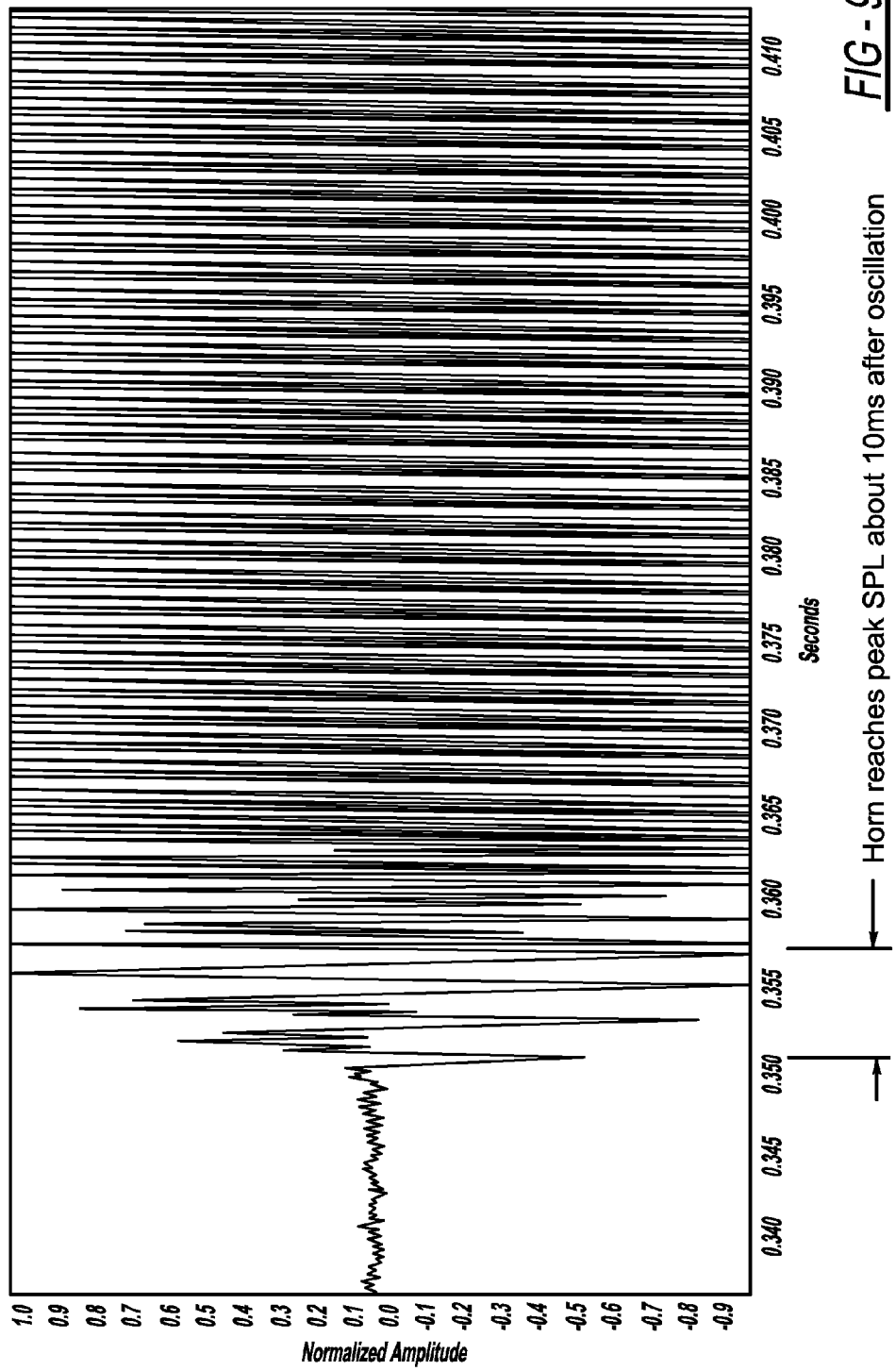
FIG. 9 is an expanded view of a MP3 audio clip of a 50 ms horn chirp of a dual-horn assembly including 400 Hz and 500 Hz trumpet horns.
Figure 10:
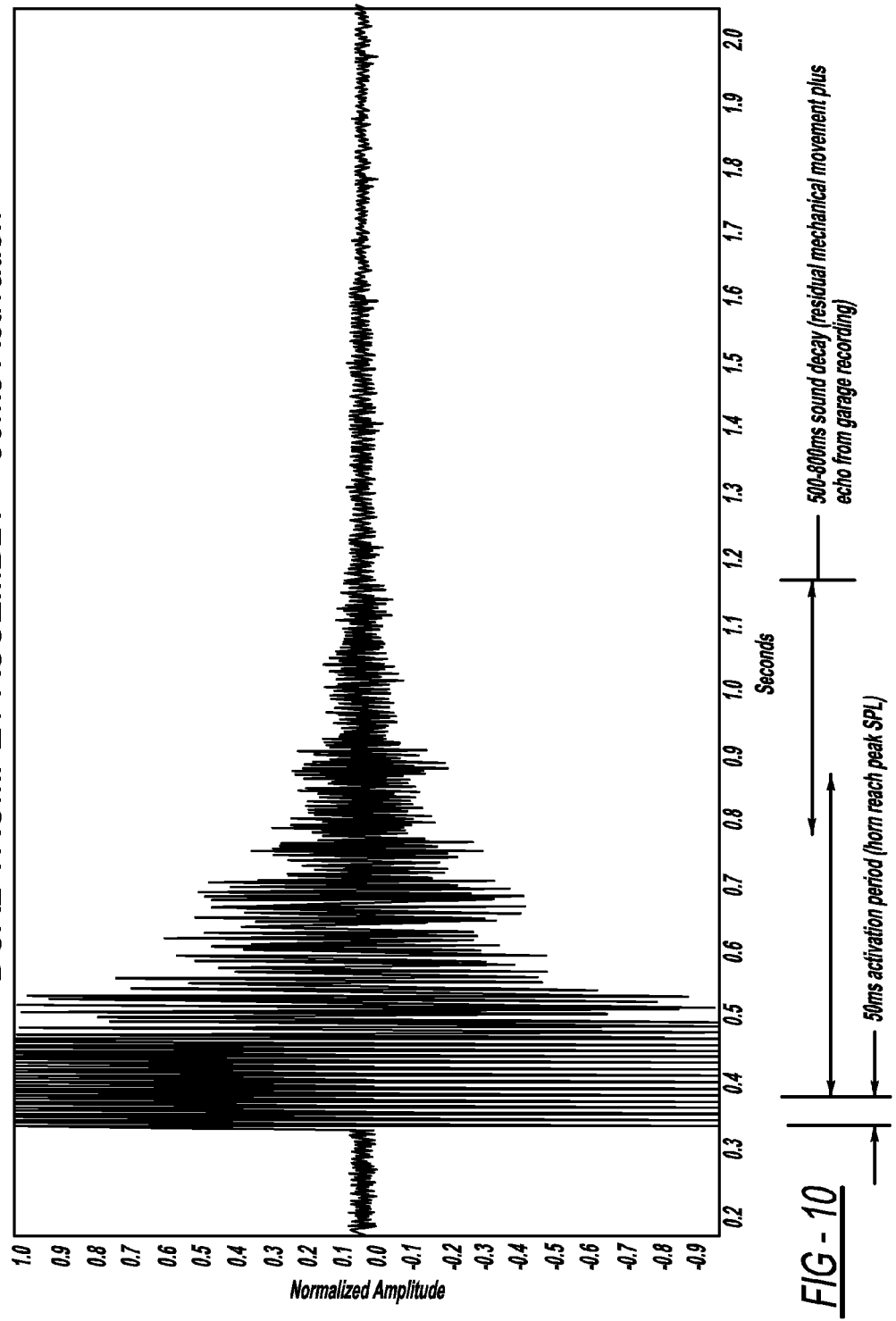
FIG. 10 is another expanded view of a MP3 audio clip of a 50 ms horn chirp of a dual-horn assembly including 400 Hz and 500 Hz trumpet horns.

Generally, FIG. 9 shows an expanded view of a MP3 audio clip of a 50 ms horn chirp of dual-horn assembly 28 including 400 Hz and 500 Hz trumpet horns. In particular, FIG. 9 shows the sound amplitude versus time. As shown, once the horn plates start to oscillate, the sound output may reach peak amplitude in approximately 10 ms. Since the horn assembly has a wide range of required drive time to ensure that oscillation starts, it may not be possible to reliably control sound output by minimizing the ON time after oscillation. Accordingly, one option may be to control the sound level by varying the amount of power (e.g., applied voltage) provided to the horn. FIG. 10 is another expanded view of a MP3 audio clip of a 50 ms horn chirp of dual-horn assembly 28 including 400 Hz and 500 Hz trumpet horns, again showing the sound amplitude versus time. The horn assembly output may quickly saturate to peak amplitude. Even after power has been removed from the horn assembly (e.g., at approximately the 50 ms point), the horn plates may continue to oscillate due to mechanical energy and/or momentum. As such, horns 12 of dual horn assembly 28 may continue to generate sound output at peak levels for approximately another 50 ms until the energy begins to dissipate. Generally, it may take approximately 100 ms after deactivation for the sound amplitude to drop to a comfortable level and up to 800 ms for the sound amplitude to drop to a level where it may no longer be audible. Accordingly, one option to control the sound level (i.e., minimize the effect of the un-powered mechanical energy stored in the horn) is to reduce the amount of power (i.e., applied voltage) originally provided to the horn.

Figure 11:
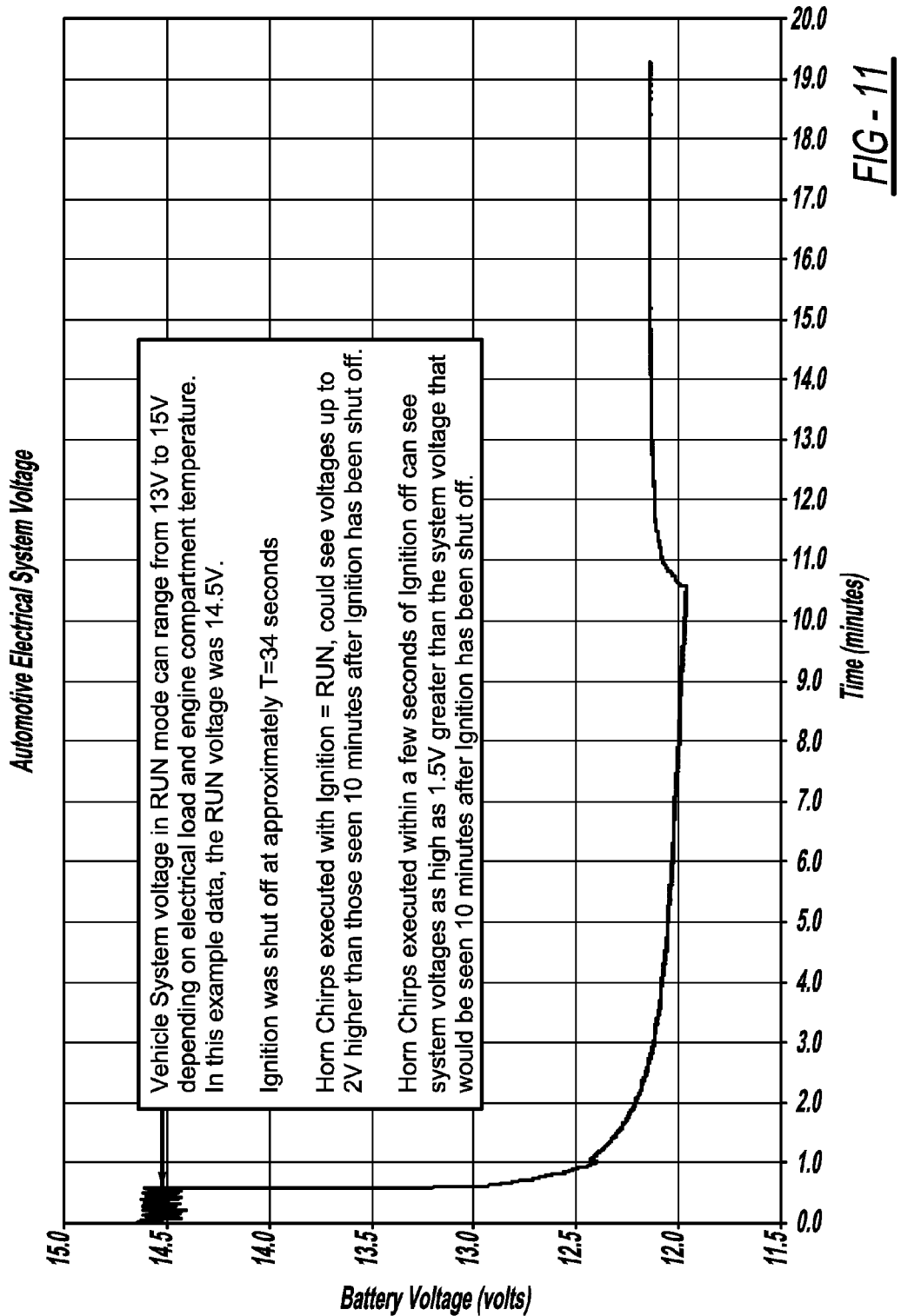
FIG. 11 is a graph illustrating a typical automotive electrical system voltage with a RUN voltage of approximately 14.5 V and ignition shut OFF at approximately 34 s.
Figure 12:
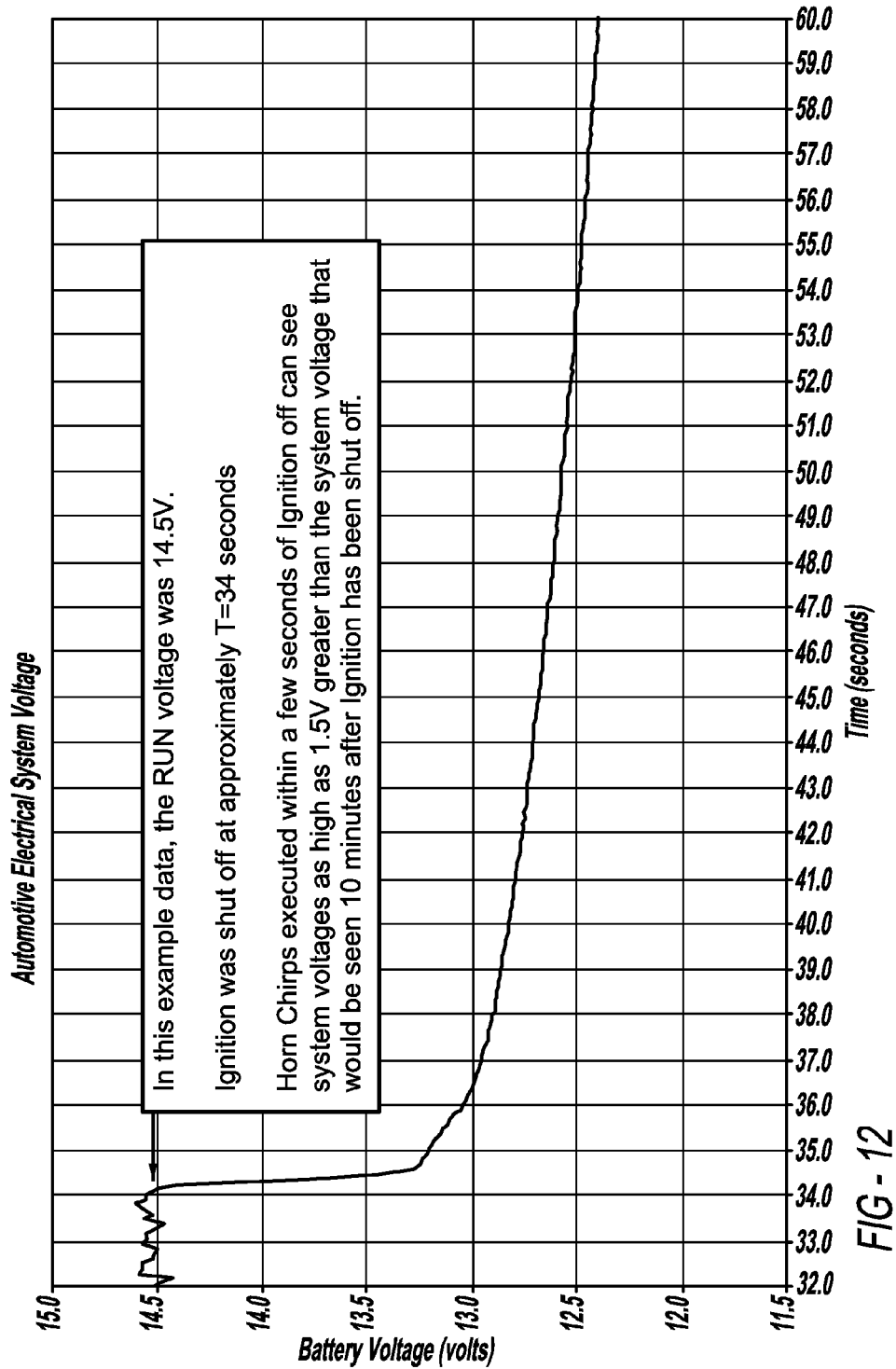
FIG. 12 is an expanded view of a portion of the graph of FIG. 11.

Referring next to FIGS. 11 and 12, typical vehicle voltage (e.g., automotive electrical system voltage) scenarios are illustrated and will be discussed.

In particular, typical vehicle system voltages in RUN mode can range from approximately 13 V to approximately 15 V depending on electrical load and engine compartment temperature. Although these vehicle voltages are mentioned in detail, the vehicle voltage may be higher or lower in other embodiments. FIG. 11 illustrates data taken from a motor vehicle where the RUN voltage was approximately 14.5 V and ignition was shut OFF at approximately 34 s. In the scenario illustrated in FIG. 11, locking/unlocking confirmation tones and/or horn chirps executed with ignition in the RUN mode could potentially see voltages up to approximately 2 V higher than those seen approximately 10 minutes after the ignition has been shut OFF. Furthermore, locking/unlocking confirmation tones and/or horn chirps executed within a few seconds of shutting OFF the ignition could see system voltages as high as approximately 1.5 V greater than the system voltage that would be seen approximately 10 minutes after the ignition has been shut OFF. FIG. 12 illustrates an expanded view of a portion of the graph of FIG. 11. In particular, the portion of the graph approximately 25 s after ignition was shut OFF is illustrated. Both FIGS. 11 and 12 illustrate that a vehicle user who uses the locking/unlocking conformation tones (e.g., horn chirps) function for RKE while the engine is running or immediately after ignition is shut OFF may experience a louder tone (i.e., horn chirp) than a vehicle user who uses the locking/unlocking confirmation tones (e.g., horn chirps) function for RKE approximately 10 minutes or more after the ignition is shut OFF.

The effect of vehicle voltage on sound output will now be described in detail with reference to FIG. 13.

Figure 13:
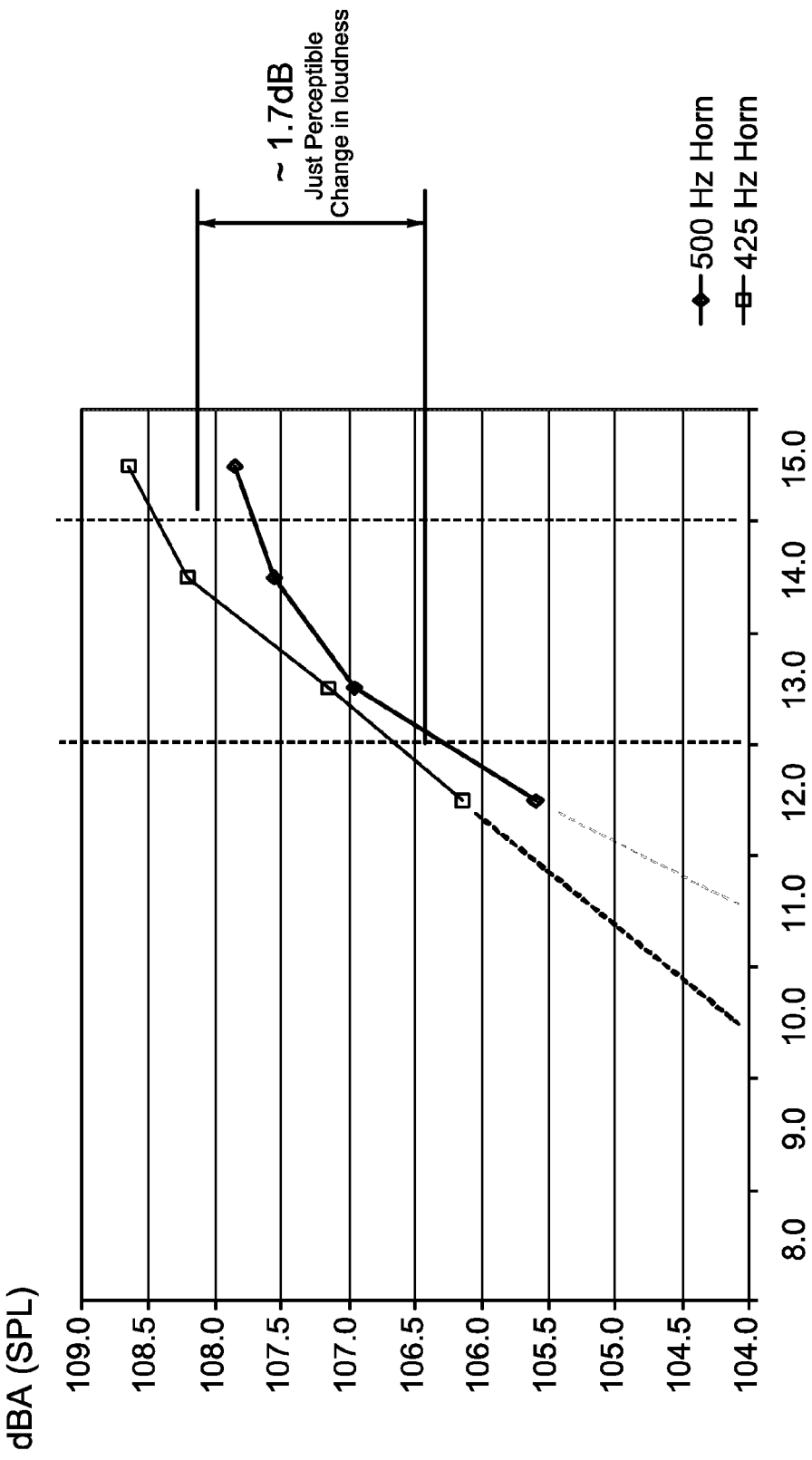
FIG. 13 is a graph illustrating the effects of vehicle voltage on sound output of a trumpet horn assembly.

In particular, FIG. 13 illustrates measurements of the sound pressure output of a dual trumpet horn assembly as measured approximately 2 m from the trumpets. The sound pressure output is measured in dBA, which is intended to be an approximation of what a person with typical hearing capability would perceive. However, actual perception may vary considerably from person to person. Furthermore, the dBA scale may be less accurate at high sound pressures (e.g., approximately 90 dB or greater). Although FIG. 13 may be the best way to represent the data analytically, jury tests of horn sound with horn voltages varied by approximately 2-3 V does confirm that a significant difference in the sound can be heard by test subjects. A portion of FIG. 13 is an estimate of the sound pressure reduction that would be further experienced as the temperature of the horn, battery, and wiring increase. For example, a shift in temperature from approximately 25° C. to approximately 85° C. would result in approximately a 23% decrease in power to the horn. This same increase in battery temperature could potentially also reduce battery voltage and further reduce power to the horn.

The present invention system and method will now be described in detail with reference to FIGS. 1-15, and particularly FIGS. 14 and 15.

A vehicle remote control system or a method for reducing the sound of an audible signal generated by a vehicle remote control system in accordance with the present invention may thus provide for reduction of the sound pressure of an existing, conventional traffic horn by controlling the pulse duration (e.g., pulse ON time to the horn). In particular, the present invention may provide for control of the pulse duration as a function of (1) system voltage; (2) time since ignition OFF (e.g., an elapsed period of time since the vehicle's ignition was disengaged); and (3) the temperature under the hood of the vehicle and/or horn temperature. Although three separate conditions and/or factors are mentioned, any combination of these conditions and/or factors may be utilized in accordance with the present invention. The method may reduce the sound for a RKE system, including the locking/unlocking confirmation tones and/or chirp sounds. The method may utilize a multi-step strategy, and one or more of any of these steps may be used in any order and/or any combination, depending upon RKE controller or module 14 capability and/or the signals available for a given vehicle application. The use of the existing, conventional traffic horn may avoid the need for significant additional hardware (e.g., a separate chirp sounder), which could potentially significantly increase cost.

Figure 14:
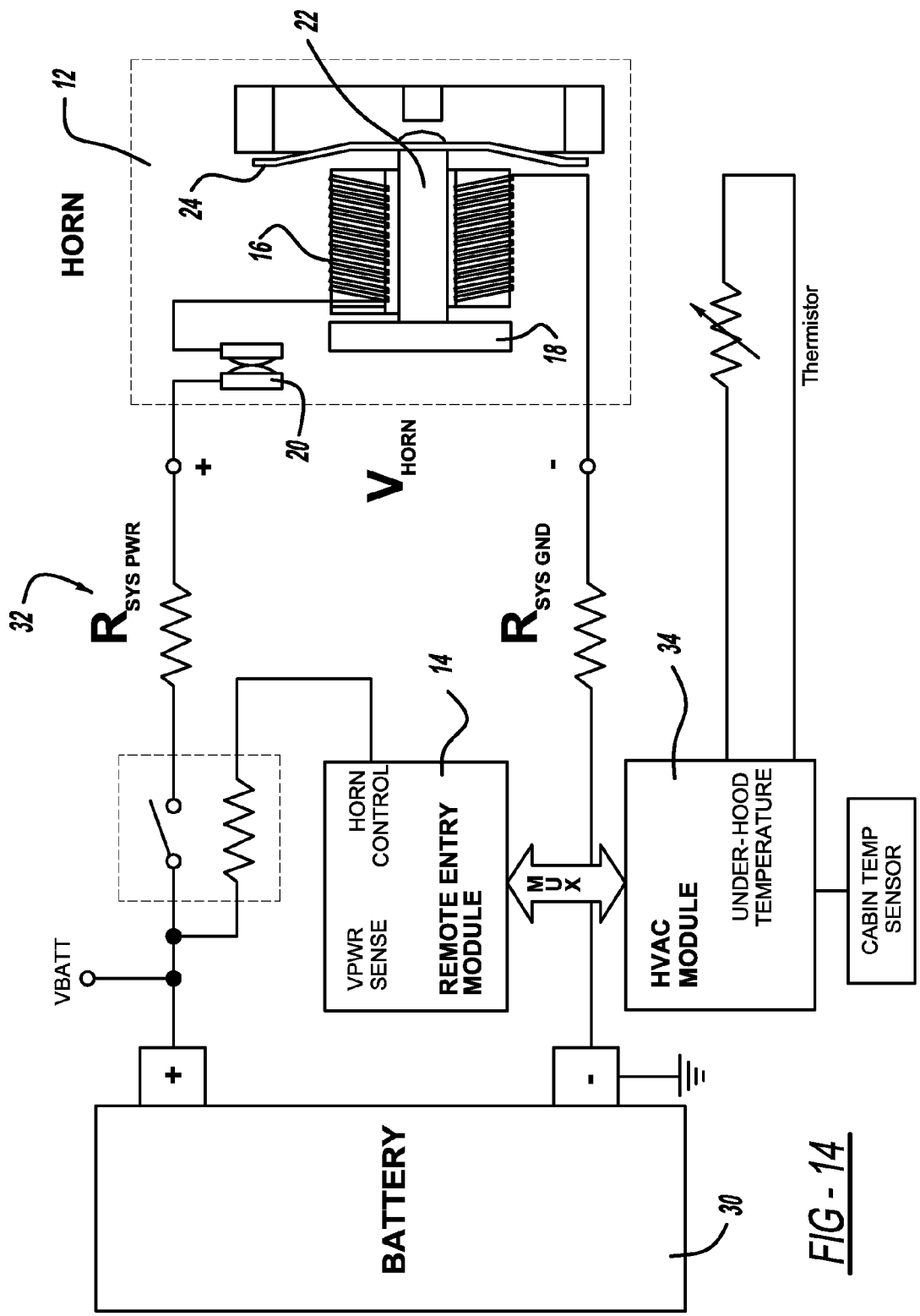
FIG. 14 is a schematic for an exemplary system configured to perform the remote entry locking chirp sound reduction method in accordance with an embodiment of the invention.

Referring now to FIG. 14, an exemplary vehicle remote control system in which the sound of an associated audible signal may be reduced in a vehicle 10 in accordance with an embodiment of the invention is illustrated. RKE controller or module 14 may be utilized to control horn function. RKE controller or module 14 may be mounted in vehicle 10, connected to the receiver, and operable in response to the signal (e.g., RF signal) from the remote transmitter. RKE controller or module 14 may be configured to generate door lock and unlock signals (e.g., audible confirmation tones and/or chirps) responsive to respective lock and unlock signals from the remote transmitter. The signals (e.g., audible confirmation tones and/or chirps) may be generated by any appropriate generator. For example and without limitation, the signals (e.g., audible confirmation tones and/or chirps) may be generated by horn 12. While not required, the use of horn 12 to generate the signals may be preferred to reduce cost by utilizing the same horn for both a traffic horn and a signal generator. Horn 12 may include associated electronic circuitry for generating a desired audible signal. Accordingly, RKE controller or module 14 may be configured to cause horn 12 to generate an audible confirmation tone and/or chirp. The audible confirmation tone and/or chirp may have a certain pulse width or pulse duration. RKE controller or module 14 may store a default pulse width, $T_D$, for the horn. The default pulse width may be configurable in an embodiment. In one embodiment, $T_D$ may be approximately 40 ms, but may be shorter or longer in other embodiments. A default pulse duration of approximately 40 ms may help to ensure actuation of a horn or dual-horn assembly at low operating voltage and high operating temperature (e.g., approximately 10 V at the battery when the vehicle wiring is compliant to series resistance requirements, for example, and at approximately 85° C. ambient temperature). The configurable default pulse width, $T_D$, may be configured to ensure that a horn or dual-horn assembly will sound (e.g., oscillate) at even the lowest possible operating voltage and warmest possible operating temperature for which the horn may be designed. The default pulse width, $T_D$, may be selected by a horn supplier and may be based on the operating parameters for which a horn is designed.

Following a command for a horn chirp request from the remote transmitter, for example, one step may be to determine a value for at least one characteristic of vehicle 10. For example, the step may include determining (e.g., reading) system voltage and/or the vehicle's ambient temperature sensor in order to ascertain system voltage and approximate horn temperature. The method may use an algorithm depending on the system voltage and/or approximate horn temperature in order to determine when and/or if the pulse duration of the horn chirp may be reduced below the default pulse duration, $T_D$. Based on the difference in the actual system voltage from the horn's minimum operating voltage (e.g., a default vehicle voltage that is used to determine a default pulse duration that will ensure horn actuation in even a worst-case scenario) and/or the difference in the temperature of the horn from room (e.g., 25° C.) temperature (e.g., a default horn temperature that is used to determine a default pulse duration that will ensure horn actuation in even a worst-case scenario), the value of the default pulse duration, $T_D$, may be reduced proportionally. RKE controller or module 14 may have access to vehicle voltage (e.g., RKE controller or module 14 may also handle alternator control and/or is a multiplexer (MUX) based RKE controller or module). Accordingly, RKE controller or module 14 may use the actual battery voltage to determine whether the default pulse duration, $T_D$, may be reduced (e.g., if the actual battery voltage is in excess of the minimum default vehicle voltage assumed for the default pulse duration, $T_D$, of the horn chirp).

In order to determine the pulse duration that may be utilized while still ensuring that horn 12 or dual-horn assembly 28 will sound (e.g., oscillate), the amount of power delivered to electromagnetic coil 16 of horn 12 (see FIG. 14) or dual-horn assembly 28 may be predicted and/or calculated utilizing the following algorithms and/or formulas:

$$P_{HORN} = \left[\frac{V_{BATT}}{R_{ACTUAL}}\right]^2 * R_{HORN}$$

$$R_{ACTUAL} = R_{TOTAL20} * \lfloor 1 + 0.00393 * (T - 20\,C.°) \rfloor$$

$$R_{HORN} = R_{HORN20} * \lfloor 1 + 0.00393 * (T - 20\,C.°) \rfloor$$

Where $R_{TOTAL} = R_{SYS\ PWR} + R_{HORN\ INITIAL} + R_{SYS\ GND}$

Where $R_{TOTAL20}$ is the total nominal resistance of the wiring harness and horn coil at 20° C.

Figure 15:
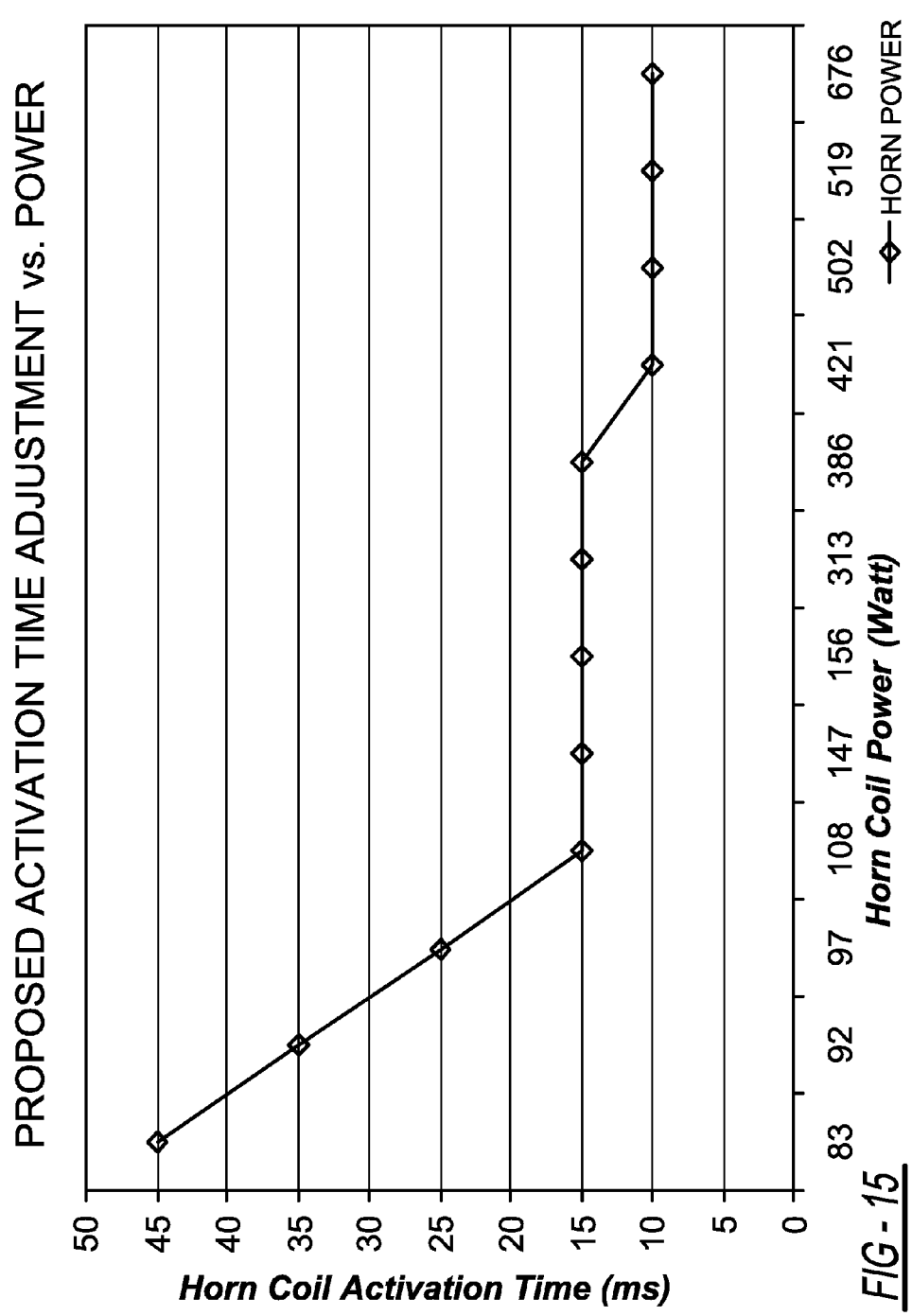
FIG. 15 is an exemplary look-up table for how horn activation may be controlled as a function of vehicle voltage and/or ambient temperature.

Referring now to FIG. 15, an exemplary look-up chart and/or table for how horn activation time may be controlled as a function of vehicle voltage and/or ambient temperature is illustrated. The look-up chart and/or table may indicate the minimum pulse duration that will still ensure actuation of horn 12 or dual-horn assembly 28 depending on the horn coil power. The horn coil power may be dependent on the vehicle system voltage and the ambient temperature as set forth in the previous algorithms and/or formulas. Although this particular look-up chart and/or table is illustrated, other look-up charts and/or tables may be utilized in other embodiments with a different set of control points or formulas to indicate the required pulse duration (e.g., time) as a function of the variables of voltage and/or temperature.

Another step of the remote entry locking chirp sound reduction method in accordance with an embodiment of the invention may be to determine if the vehicle has an electronic automatic climate control (EATC) system 34. EATC system 34 may include an ambient air sensor. Horn 12 may typically be mounted near or on an upper radiator support of vehicle 10. After period of driving, horn 12 may in an area with an ambient temperature of approximately 60-85° C., even when the cabin or fresh air is at approximately 25° C. The EATC ambient air sensor is typically located near or on the upper radiator support of vehicle 10 (as horn 12 is), thereby ensuring that the EATC ambient temperature detected by the EATC ambient air sensor provides a good estimate for the ambient temperature of horn 12. Accordingly, the signal acquired from the EATC ambient air sensor should not be a filtered version (e.g., time compensated for no air flow), but rather, the raw temperature measurement from the EATC ambient air sensor. When vehicle 10 has EATC system 34, then the pulse duration of the locking/unlocking confirmation tone and/or horn chirp may be further reduced if the ambient temperature is below the maximum default horn temperature assumed for the default pulse duration, $T_D$, of the horn chirp. For example only, if the ambient temperature is below the maximum temperature assumed for the default pulse duration (e.g., the default horn temperature) by a significant or even a smaller amount, then the power to electromagnetic coil 16 of horn 12 or assembly 28 may be increased according to the algorithms and/or formulas disclosed herein, and the pulse duration may be further reduced (e.g. reduced in accordance with the look-up table and/or chart illustrated in FIG. 15 showing proposed horn activation time versus the horn coil power) while still ensuring horn activation.

In another embodiment, the remote entry locking chirp sound reduction method may utilize two default pulse durations for the locking/unlocking confirmation tone and/or horn chirp. This embodiment may be useful in cases where RKE controller or module 14 does not have access to vehicle voltage. A first default pulse duration of the horn chirp may be greater than a second default pulse duration of the horn chirp. For example and without limitation, a first default pulse duration of the horn chirp may be approximately 40 ms, and a second default pulse duration of the horn chirp may be approximately 30 ms. Although 40 ms and 30 ms, respectively, are mentioned in detail, the first and second default pulse durations may be shorter or longer in other embodiments. Because RKE controller or module 14 does not have access to vehicle voltage, the second default pulse duration (e.g., shorter default pulse duration) may be used if the locking/unlocking confirmation tone and/or chirp is commanded within a certain, predetermined period of time following the vehicle exiting an engine run mode. The second default pulse duration may be used because generally a higher battery voltage (e.g., approximately 13-16 V) exists at or around the time that the ignition is turned OFF and when the battery has not yet decayed to its nominal OFF value (e.g., approximately 12.4 V for a good state of charge). For example and without limitation, the predetermined period of time may be approximately 5 minutes. Although 5 minutes is mentioned in detail, the predetermined period of time may be shorter or longer in other embodiments. The predetermined period of time may be configurable and may be adjusted according to any preferred specification.

To summarize, the invention thus provides a more quiet, more pleasant, and/or more luxurious sounding locking chirp for a RKE system that does not require increased hardware which could result in an increase in the incremental cost per vehicle. The invention also provides a system for reducing pulse duration below a minimum pulse duration required in order to ensure start-up of the horn or dual-horn assembly in a worst-case scenario, without the drawback of unnecessarily loud confirmation tones or locking chirps under certain conditions (e.g., more voltage and/or lower temperatures). The invention yet further provides a system which allows for varying and/or adjusting of the pulse duration of the locking/unlocking confirmation tone or chirp based on the measured or estimated conditions or characteristics of the vehicle (e.g., voltage and temperature conditions).

Those skilled in the art would appreciate in view of this disclosure that various modifications may be made to the system and method described above without departing from the scope of the present invention. For example, the aforementioned system and method may be used for actuation of a vehicle horn for an entry as well as a locking chirp. Yet further, the aforementioned system and method may be used in conjunction with a vehicle theft alarm system for controlling the sound level.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle remote entry locking or unlocking chirp sound reduction system comprising:
   a remote transmitter operable to transmit a signal;
   a receiver operable to receive the signal from the remote transmitter;
   a controller operably connected to the receiver and being operable in response to the signal from the remote transmitter;
   a horn operably connected to the controller and connected to a power supply of the vehicle via wiring, wherein the wiring has a resistance that varies based on temperature; and
   a temperature sensor for sensing a temperature,
   wherein the controller determines a temperature of the wiring based on the sensed temperature and estimates a voltage applied to the horn based on the determined temperature and a voltage of the power supply, and wherein the controller is configured to cause the horn to generate an audible signal having a predetermined pulse duration which depends on the estimated voltage applied to the horn prior to or during actuation of the remote transmitter.

2. The system according to claim 1, wherein the pulse duration is changeable by the controller.

3. The system according to claim 1, wherein the temperature sensor comprises a first temperature sensor for sensing a temperature of a cabin of the vehicle and a second temperature sensor for sensing a temperature under the hood of the vehicle, wherein the controller determines temperature of the wiring based on the sensed temperature of the cabin and sensed temperature under the hood.

4. The system according to claim 1, wherein the at least one characteristic includes a period of time since a vehicle ignition was disengaged.

5. The system according to claim 1, wherein the voltage at the horn is determined further based upon a resistance of the wiring and length of the wiring.

6. The system according to claim 1, wherein the horn comprises a trumpet horn.

7. The system according to claim 1, wherein the horn is further usable as a traffic horn.

8. The system according to claim 1, wherein the controller stores a default pulse duration.

9. The system according to claim 8, wherein the default pulse duration is approximately 20-50 ms.

10. The system according to claim 8, wherein the default pulse duration is configured to ensure actuation of the horn at a vehicle system voltage of approximately 10 V and a horn temperature of approximately 85° C.

11. A method of reducing the sound of an audible signal generated by actuation of a vehicle remote entry system, said method comprising:
    providing a remote transmitter and a receiver;
    sending a signal from the remote transmitter to the receiver;
    sensing a voltage of a power supply of the vehicle;
    determining a temperature of wiring connecting the power supply to a horn;
    determining an estimated voltage applied to the horn based on the sensed voltage and the determined temperature; and
    generating the audible signal having a pulse duration that depends on the estimated voltage.

12. The method according to claim 11, wherein the temperature is determined based on a temperature of a cabin of the vehicle and a temperature under the hood of the vehicle.

13. The method according to claim 11, wherein a period of time since a vehicle ignition was disengaged.

14. The method according to claim 12, wherein the temperature of the cabin is determined using an ambient temperature sensor of an electronic automatic climate control system of the vehicle.

15. The method according to claim 11, wherein the audible signal is generated using a trumpet horn.

16. The method according to claim 11, wherein the audible signal is generated using a traffic horn.

17. The method according to claim 11, wherein the pulse duration is a default pulse duration, the default pulse duration is determined using a default vehicle voltage and default horn temperature.

18. The method according to claim 17, wherein the pulse duration is shorter than the default pulse duration if the determined value for at least one characteristic of the vehicle indicates that the voltage of the vehicle is greater than the default vehicle voltage or that the horn temperature is less than the default horn temperature.

19. The method according to claim 11, wherein the pulse duration is determined using a table or algorithm that provides pulse duration as a function of vehicle voltage or ambient temperature.

20. The method according to claim 19, wherein the algorithm is adjusted based on wiring resistance estimated from a HVAC cabin temperature sensor.

21. A method of reducing the sound of an audible signal generated by actuation of a vehicle remote entry system, said method comprising:
   providing a remote transmitter and a receiver;
   sending a signal from the remote transmitter to the receiver;
   determining a period of time elapsed since a vehicle ignition was disengaged; and
   responsive to receiving said remote transmitter signal, generating an audible signal having a first default pulse duration if the period of time exceeds a predetermined value and a second default pulse duration if the period of time is less than or equal to the predetermined value, wherein the first default pulse duration is greater than the second default pulse duration.

22. A method of generating an audible signal for a vehicle remote entry system comprising:
   sending a signal from a remote transmitter to a receiver;
   sensing voltage of a power supply of the vehicle;
   estimating temperature of wiring connecting the power supply to a horn;
   estimating a voltage applied to the horn based on the estimated temperature and sensed voltage; and
   generating the audible signal having a pulse duration that depends on the estimated voltage.

23. A method according to claim 22, wherein the temperature is estimated based on a temperature of a cabin of the vehicle and a temperature under the hood of the vehicle.

* * * * *